T. BEVEN.
Machines for Uniting the Selvages of Knit Fabrics.
No. 137,997. Patented April 22, 1873.

Witnesses:
Charles William Williams
Mury Freeston Suffolk

Inventor:
Thomas Beven
C. S. Whitman Attorney.

T. BEVEN.
Machines for Uniting the Selvages of Knit Fabrics.
No. 137,997. Patented April 22, 1873.
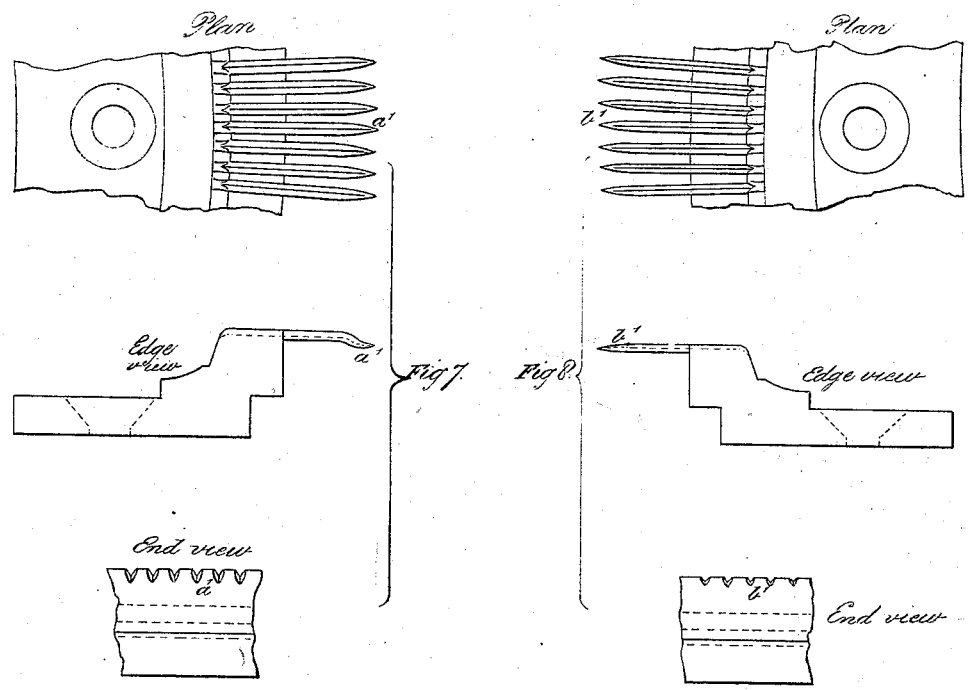
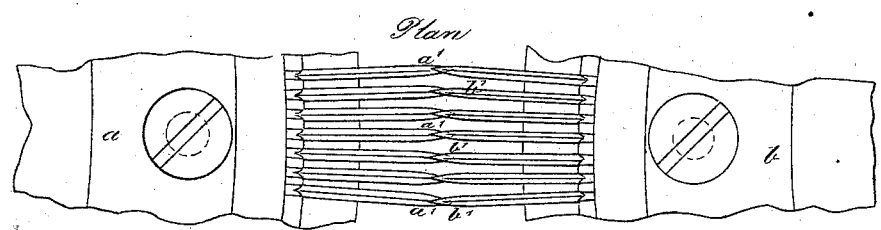
Fig 6.
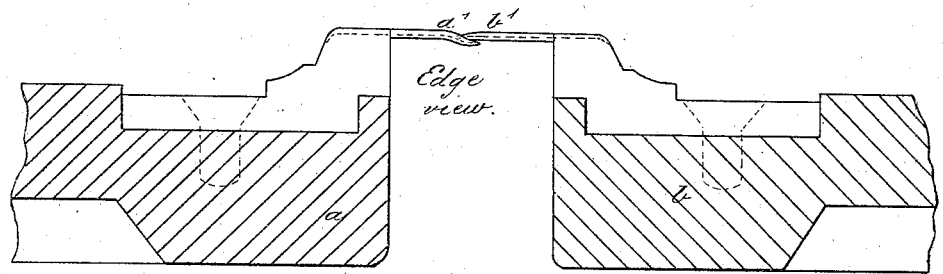
Witnesses:
Charles William Williams
Henry Freeston Suffolk.
Inventor:
Thomas Beven
C. S. Whitman, Attorney 7 Sheets--Sheet 7.

T. BEVEN.
Machines for Uniting the Selvages of Knit Fabrics.
No. 137,997. Patented April 22, 1873.

Witnesses:
Charles William Williams
Henry Freeston Suffolk.

Inventor:
Thomas Beven
C. S. Whitman Attorney.

UNITED STATES PATENT OFFICE.

THOMAS BEVEN, OF WARD'S END, LOUGHBOROUGH, ASSIGNOR TO JOHN MUNDELLA, OF NOTTINGHAM, ENGLAND.

IMPROVEMENT IN MACHINES FOR UNITING THE SELVAGES OF KNIT FABRICS.

Specification forming part of Letters Patent No. 137,997, dated April 22, 1873; application filed November 4, 1872.

*To all whom it may concern:*

Be it known that I, THOMAS BEVEN, of Ward's End, Loughborough, in the county of Leicester, England, in the employment of the Nottingham Manufacturing Company, have invented Improvements in Means or Apparatus for Uniting Parts of Looped Fabrics; and I do hereby declare that the following is a full and exact description thereof, reference being had to the accompanying drawing and to the letters of reference marked thereon.

The object of the invention is to facilitate the uniting together of parts of looped fabrics, and the improvements are particularly applicable to uniting together parts of looped fabrics at the selvages. The selvage-edges of looped fabrics have a tendency to curl over to one surface thereof, and, in consequence, while it is comparatively easy to lay the selvage-loops onto a series of points, with one face or surface of the fabric toward such points, it is very difficult to lay the corresponding selvage-loops onto such points, with the opposite face of the fabric toward them, as is necessary in uniting two such parts of such fabric together in order that the same surface may appear as the outer surface, alike of both portions of fabric when united. To remedy this evil I lay the loops of the two separate parts of fabric to be united together onto separate series of points or holding-instruments, the loops at the edge of the one portion of fabric being laid on one series of points or holding-instruments, and the loops at the edge of the other portion of fabric being laid on the other series of points or holding-instruments, and I apply these separate series of points or holding-instruments so that the one portion of fabric on one set of points or holding-instruments may be progressively transferred therefrom to those of the other, which then holds both in position to receive the uniting thread or threads. The respective points or holders for the different parts of the fabric to be united are by preference set radially in rings or wheels capable of corresponding simultaneous rotary motions.

But that the invention may be fully understood I will, by the aid of the accompanying drawing, proceed more in detail to describe means pursued by me in carrying the same into effect.

*Description of the Drawing.*

Figs. 6, 7, and 8, show detail views on a larger scale.

In each of the views the same letters are employed to indicate corresponding parts wherever they occur.

Figure 1:
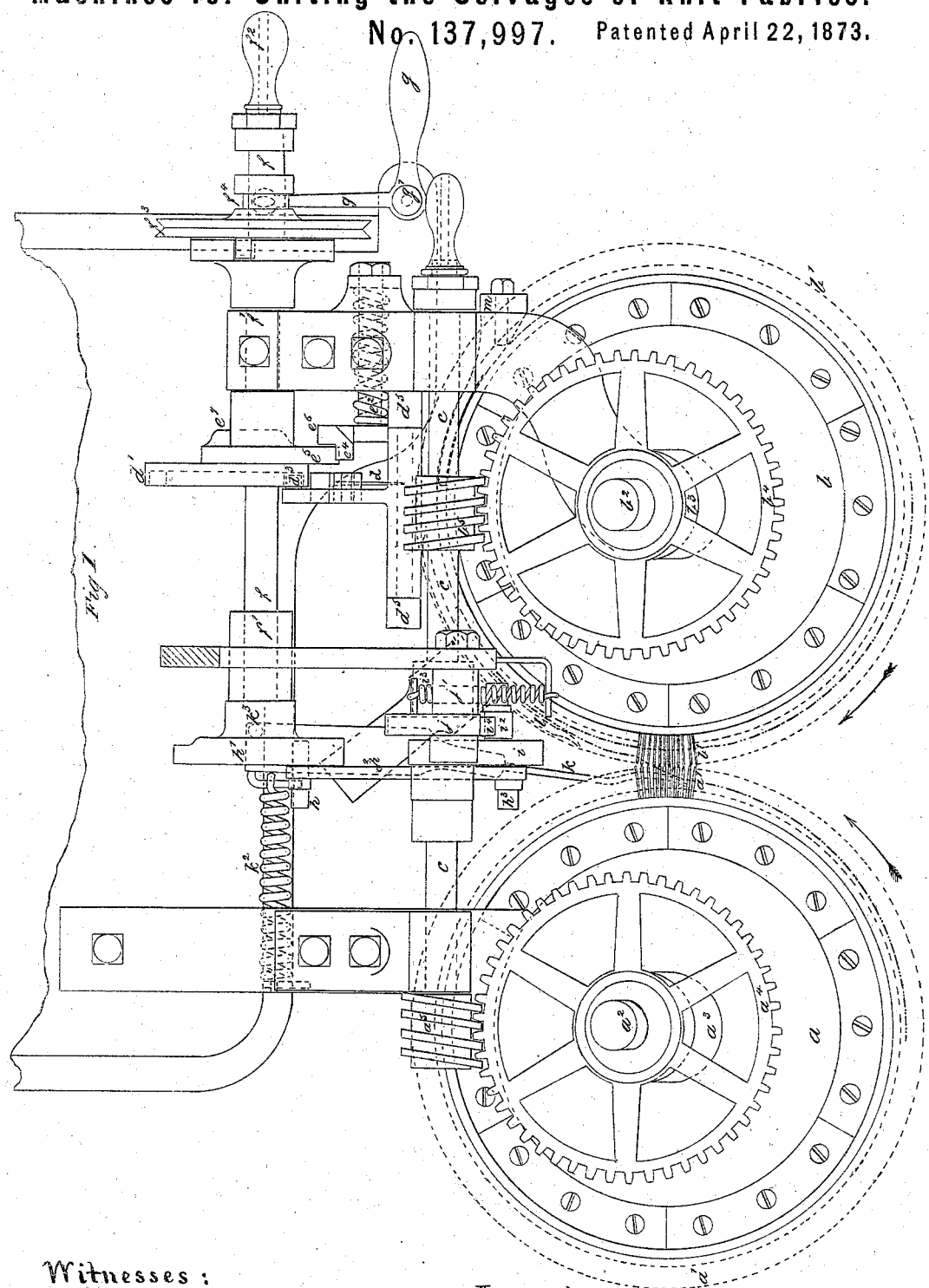
Figure 1 shows a plan view.
Figure 2:
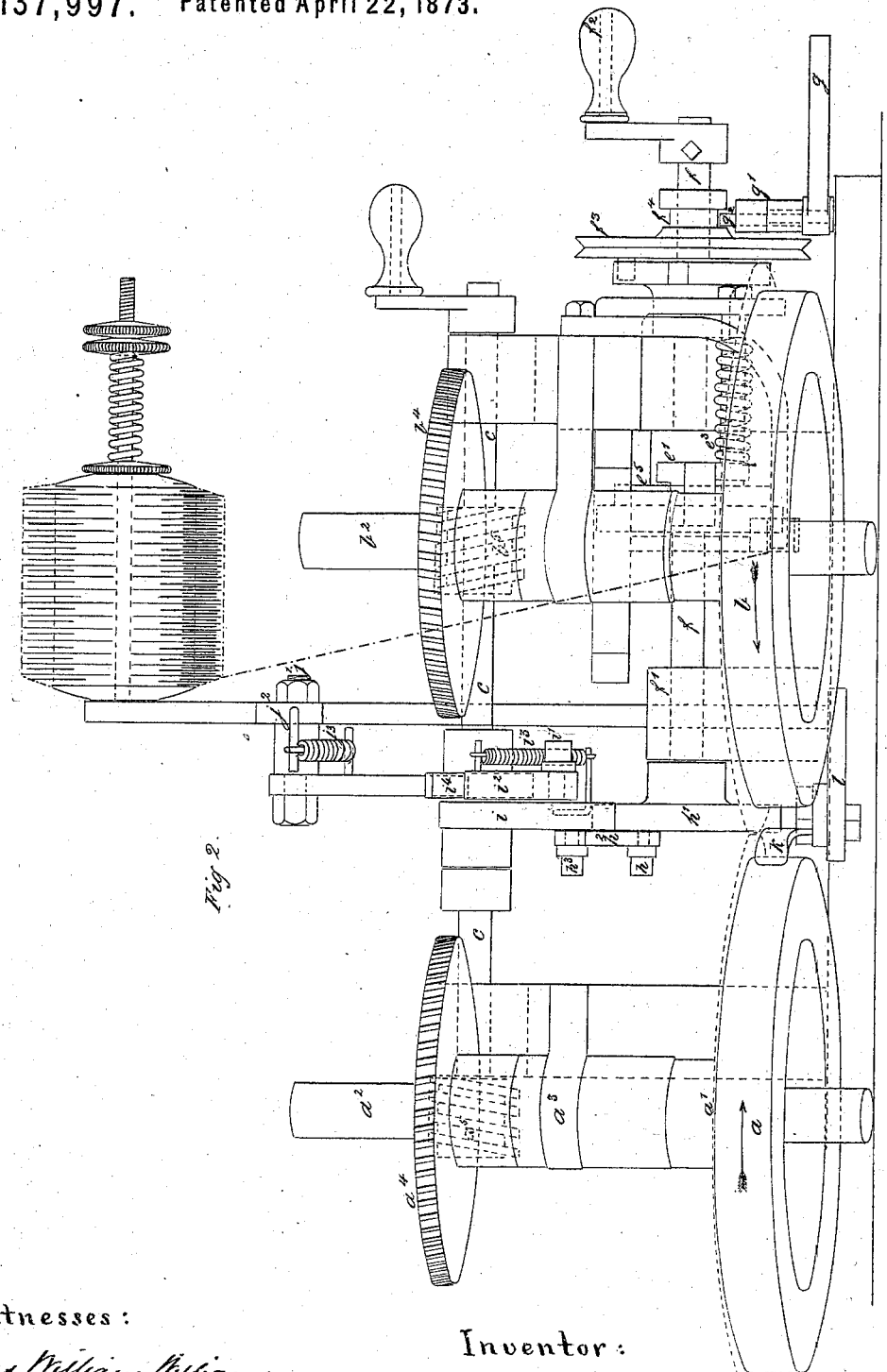
Fig. 2, a front view.
Figure 3:
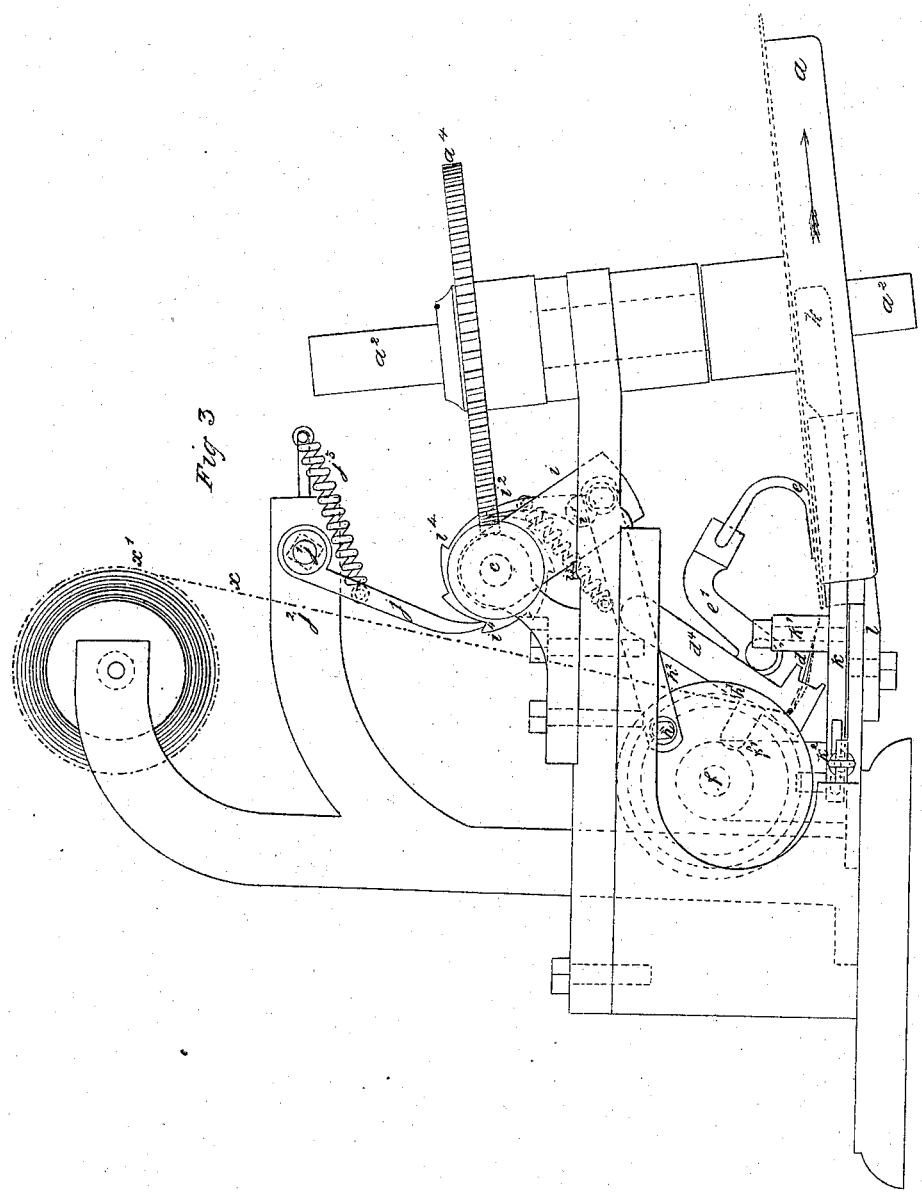
Fig. 3, an end view.
Figure 4:
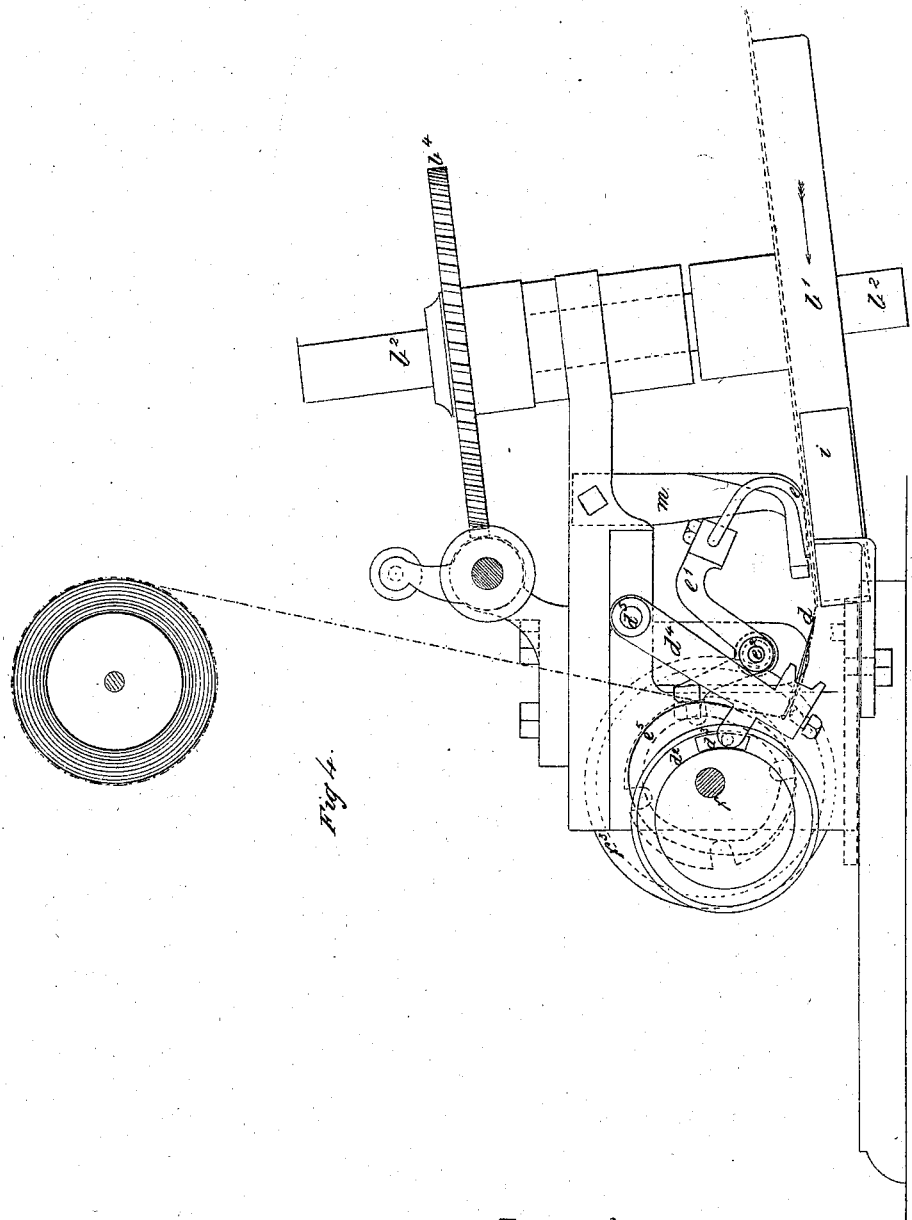
Fig. 4, a sectional view.
Figure 5:
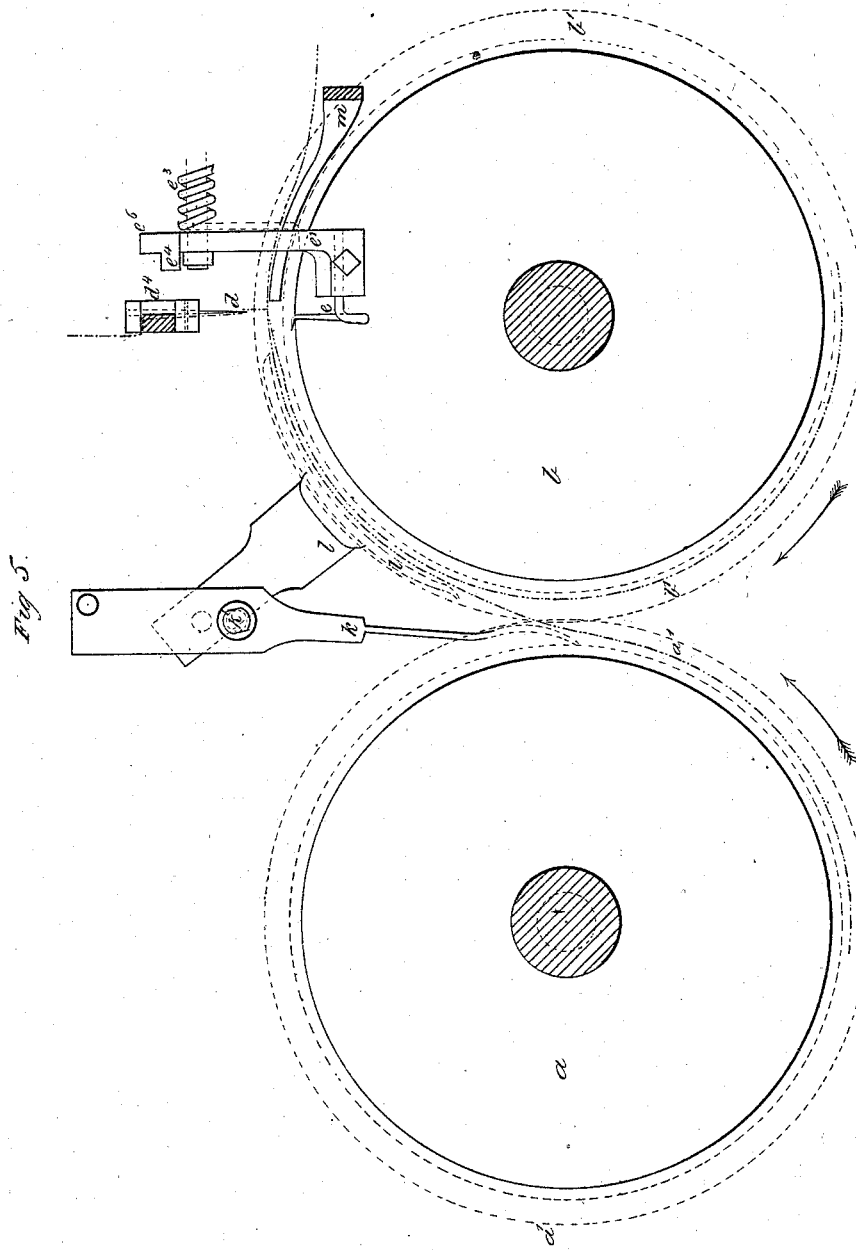
Fig. 5, a sectional plan view of parts of apparatus arranged according to my invention.
Figure 9:
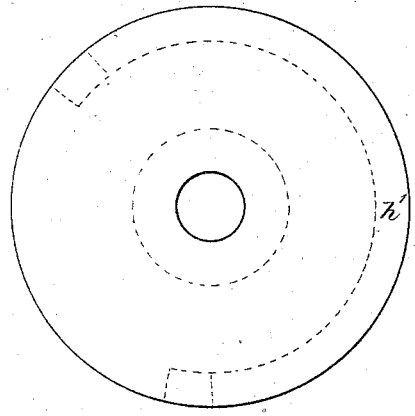
Figs. 9 and 10, views of the cams or tappets used.
Figure 10:
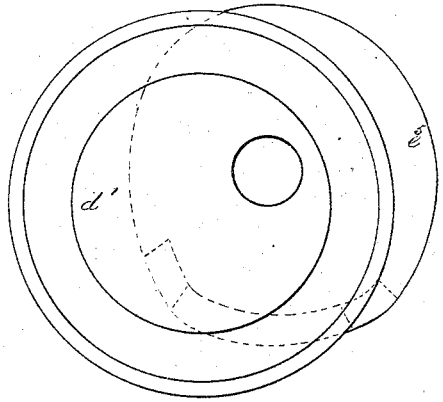
Figure 11:
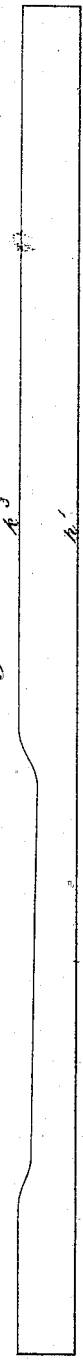
Figure 12:
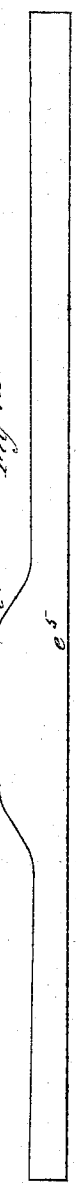

$a$ $b$ are two rings or wheels carrying, respectively, the points or holding-instruments $a^1$ and $b^1$. The ring or wheel $a$ is affixed to the shaft or axis $a^2$, which is supported so as to revolve in the fixed bearings $a^3$ $a^3$, and this axis $a^2$ has applied to it the tooth-wheel $a^4$, the teeth of which are inclined so as to take into the teeth of the worm-wheel $a^5$ affixed on the axis $c$. The ring or wheel $b$ is affixed to the shaft or axis $b^2$, which is supported so as to revolve in the fixed bearings $b^3$, and this shaft or axis $b^2$ has affixed on it the tooth-wheel $b^4$, the teeth of which are inclined to take into the teeth of the worm-wheel $b^5$, also affixed on the shaft or axis $c$, so that on motion being given to the shaft or axis $c$ simultaneous motion will be given to the two wheels $a$ and $b$ to cause them to travel toward each other in the direction of the arrows, and so that their respective points or holding-instruments may, in such motion, come, one over those of the other. The points or holding-instruments in the one ring, $a$, for this purpose corresponding in number and relative position to those in the other ring, $b$. The form of these points or holding-instruments $a^1$ and $b^1$ will be better understood by reference to the enlarged views of them, drawn to an enlarged scale, at Figs. 6, 7, and 8. These points or holding-instruments, as shown, are each recessed on their upper surface. The points or instruments $a^1$ are somewhat broader than the points or instruments $b^1$, and each of them is adapted to receive into it one of the points or instruments $b^1$ at the time of their coming together. The points or instruments $b^1$ are each recessed on their upper surface, to facilitate the passage of the sewing-needle, (hereafter more particularly referred to,) with the thread carried thereby, under the loops of the two portions of fabric to be united. $d$ is the needle for carrying the uniting or sewing thread, indicated by the line $x$, through the loops of the portions of fabric to be united; and $e$ is the hooked instrument for taking into the thread thus passed through the loops of the fabric, and holding it while the needle recedes to enter a fresh pair of loops, when re-entering the proportions of fabric, in effecting the sewing together, by what is called a loop or chain stitch; and I would here remark that although I have shown a single thread as the means of uniting the two portions of fabric by a loop or chain stitch, such may be varied. Motion is given to these various parts from the main or driving axis $f$, which is supported to revolve in the fixed bearings $f^1 f^1$, and has applied to it the winch-handle $f^2$, by which it may be caused to rotate by hand, when so desired, and it has also applied to it the pulley-wheel $f^3$, which is adapted to receive a gut or band to be driven by steam or other suitable power; and this pulley is capable of sliding endwise on this shaft or axis $f$, so as to turn freely on this shaft $f$ without moving it, or, when brought into clutch connection with it, of causing rotary motion to be given to that shaft $f$. The sliding of this pulley-wheel $f^3$ on the axis $f$ is effected by the lever-handle $g$, which is supported to turn on the fixed stud $g^1$, and has a pin or feather, $g^2$, standing up from it into the groove $f^4$ of the boss of the pulley-wheel $f^3$. On the axis or shaft $f$ is affixed the ring-cam $d^1$ for operating the needle $d$ by the recess $d^2$ in that cam $d^1$, receiving a truck or sliding piece, $d^3$, carried by a projection from one end of the lever $d^4$, which is supported to turn on the fixed pin $d^5$, and at its other end carries the needle $d$, for the necessary to-and-fro motions to that needle. The sewing-thread $x$ passes from the bobbin $x'$ down through a hole formed for it in the lower part of the lever needle holder or arm $d^4$ to the needle $d$. The hook or holder $e$ is carried, as shown, by the one end or arm of the lever $e^1$, which is supported to turn on the fixed stud $e^2$, and is acted upon by the spring $e^3$ to cause the part $e^4$ of the other end or arm thereof to bear against the surface of the cam or tappet $e^5$, while that spring $e^3$ also gives to the lever-arm $e^1$ a tendency for its surface $e^6$ to bear against the side surface $e^7$ of the cam or tappet $e^5$, so that a sidewise motion may be imparted to the hooked instrument $e$ by the action of the form of the side surface $e^7$ of the cam or tappet $e^5$, in order that such instrument $e$ may be capable of entering the loop of thread passed by the needle $d$ through the loops of the fabric, and of holding that loop of thread while the needle retires to enter the fabric again, but by a fresh pair of loops, and into such previously-formed loop of the thread $x$, when the hooked instrument will have a sidewise movement imparted to it to release that previous loop of thread, which loop as the hook $e$ retires rests against the end of the instrument $m$. The hook $e$ then takes into that loop made by the re-entering of the needle, and so on, as is well understood, and which method of sewing separately forms no part of these improvements. The step-by-step motion desired is given to the shaft or axis $c$ by the crank-pin $h$ affixed in the plate $h'$ affixed on the end of the shaft or axis $f$, acting, by the connecting-rod $h^2$ upon the rocking-arm $i$, such connecting-rod $h^2$ being connected to the arm $i$ by the pin $h^3$. The lever $i$ is supported to rock on the shaft or axis $c$, while it carries, by a pin, $i^1$, a click or driver, $i^2$, which is borne by the spring $i^3$ with its outer end against the teeth of the ratchet-wheel $i^4$ affixed on the axis $c$, so as to impart a step-by-step rotary motion to that ratchet-wheel $i^4$, and thence to the shaft or axis $c$ and to the wheels $a$ and $b$. $j$ is a stop supported by the stationary stud $j^1$ from the standard $j^2$, and borne toward the ratchet-wheel $i^4$ by a spring, $j^2$, to prevent back motion to that wheel $i^4$ and parts operated thereby.

In operating with this apparatus each portion of the fabric will be hung by its loops at the edges to be united together on the points or instruments $a^1$ and $b^1$, the one portion on the one set of points or instruments, and the other on the other set of points or instruments, and with the corresponding faces of each toward the rim of each respective wheel $a$ or $b$. Then, when the apparatus is set in motion as the parts of the fabric approach the one to the other, the fabric on the points $a^1$ of the wheel $a$ will be progressively moved off those points $a^1$ onto the points $b^1$ by the aid of the outer end of the lever-arm $k$, which is supported to turn on the stud $k^1$, and is borne, by the spring $k^2$, against the cam-surface $k^3$ on the side of the wheel $h^1$. The two portions of the fabric will then be suspended by the loops at the parts thereof, to be sewn together by the points or instruments $b^1$, and they are held thereon by the curved plate $l$ until these two portions of fabric come opposite to the needle $d$, and are sewn together by the sewing thread or threads employed. The instruments $a^1$ are broader than the instruments $b^1$ to receive within, and thereby in part cover the instruments $b^1$.

In the arrangement shown the hollow of each of these instruments $a^1$ is on their upper surface, so as to receive the instruments $b^1$ within their upper surface, but the instruments $a^1$ may be applied so that their hollow surface is on their under side, when, in working, they will travel over, and so as to receive the instruments $b^1$ within their under surface. The object in any case is that as the two series of instruments $a^1$ and $b^1$ revolve, with the separate portions of fabric on them, facility may be afforded by the covering of the points $b^1$ by the points $a^1$ for the transfer onto the points $b$ of that portion of the fabric which had been held by the points $a^1$, so that both portions of fabric may be suspended from the points $b^1$ for the sewing of them together.

Having thus described my invention, and means which I adopt in carrying the same into effect, I would have it understood that I do not confine myself to the precise details of parts, as shown and described, as these may be varied without departing from the peculiar character of the invention; but

What I claim is—

The arrangement and combination of the two sets of points or holding-instruments acting substantially as described, whereby parts of looped fabrics to be united are brought together for that purpose, as set forth.

In testimony whereof I have signed my name to this specification in the presence of two subscribing witnesses.

THOMAS BEVEN.

Witnesses:
 CHARLES WILLIAM WILLIAMS,
 JOHN BLACK.